United States Patent
Kim et al.

(10) Patent No.: US 10,692,309 B2
(45) Date of Patent: Jun. 23, 2020

(54) FLIGHT MANAGEMENT SYSTEM HAVING PERFORMANCE TABLE DATALINK CAPABILITY

(71) Applicant: The Boeing Company, Chicago, IL (US)

(72) Inventors: Geun Il Kim, Woodinville, WA (US); Roy S. Alcantara, Seattle, WA (US); Steven J. Moskalik, Seattle, WA (US); Monica S. Alcabin, Seattle, WA (US); Caroline Klein, Bothell, WA (US); Yian Guan, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 15/662,020

(22) Filed: Jul. 27, 2017

(65) Prior Publication Data
US 2019/0035178 A1    Jan. 31, 2019

(51) Int. Cl.
| | | |
|---|---|---|
| G07C 5/08 | (2006.01) |
| G07C 5/00 | (2006.01) |
| G08G 5/00 | (2006.01) |
| G06Q 10/04 | (2012.01) |
| G06Q 10/00 | (2012.01) |

(52) U.S. Cl.
CPC .......... *G07C 5/0825* (2013.01); *G06Q 10/00* (2013.01); *G06Q 10/04* (2013.01); *G07C 5/008* (2013.01); *G07C 5/085* (2013.01); *G08G 5/0013* (2013.01); *G08G 5/0021* (2013.01)

(58) Field of Classification Search
None
See application file for complete search history.

(56) References Cited

U.S. PATENT DOCUMENTS

| | | | |
|---|---|---|---|
| 7,739,004 B2 | 6/2010 | Johnson | |
| 9,542,851 B1 | 1/2017 | Kim et al. | |
| 10,071,818 B2 * | 9/2018 | Kim, II | G07C 5/0808 |

(Continued)

FOREIGN PATENT DOCUMENTS

EP    3193268 A1    7/2017

OTHER PUBLICATIONS

Extended European Search Report dated Aug. 18, 2018 in European Application No. 18179929.7 (European counterpart of the instant patent application).

(Continued)

*Primary Examiner* — Thomas G Black
*Assistant Examiner* — Demetra R Smith-Stewart
(74) *Attorney, Agent, or Firm* — Ostrager Chong Flaherty & Broitman P.C.

(57) ABSTRACT

A flight management system which is capable of monitoring changes in airplane characteristics. The flight management system is configured with a datalink management function that enables the uploading of updated performance table data from a ground station via a datalink. Upon receipt of updated aerodynamic and propulsion performance data via the datalink, the flight management system creates or updates a set of airplane performance tables or curves in a database which can be utilized to compute more accurate flight profile and trip prediction parameters, such as estimated time of arrival and predicted fuel consumption quantity.

20 Claims, 8 Drawing Sheets

(56) References Cited

U.S. PATENT DOCUMENTS

2016/0093219 A1\* 3/2016 Bailey .................. G08G 5/0013
                                                                  701/120
2017/0197727 A1\* 7/2017 Kim, II .................. G06F 16/23

OTHER PUBLICATIONS

European Examination Report dated Jan. 19, 2020, in European Application No. 18179929.7 (European counterpart of the instant patent application).

\* cited by examiner

```
            1       5        10        15        20    24
 1                        PERF FACTOR        2/2
    F-F DIFF
 3 1.5%
    DRAG DIFF
 5 2.0%
    DURATION
 7 30D
 9
11
13 <INDEX                                          ---
```

FIG. 4

```
            1       5        10        15        20    24
 1                        PERF LIMITS        2/2
    TIME ERROR TOLERANCE
 3      8 SEC AT RTA WPT
    MIN SPD  --CLB--    MAX SP
 5 210/.500                      340/.820
                --CRZ--
 7 220/.650                      340/.820
                --DES--
 9 240/.500                      320/.780
11                              REQUEST>
   -------------------------
13 <INDEX                           RTA>
```

FLIGHT MANAGEMENT SYSTEM HAVING PERFORMANCE TABLE DATALINK CAPABILITY

BACKGROUND

The technology disclosed herein generally relates to flight management systems for airplanes and, more particularly, relates to techniques for computing predicted flight profile and associated trip prediction parameters in a flight management system.

A flight management system installed in the flight deck of a modern airplane performs various flight critical functions such as navigation, guidance, flight planning, datalink and performance. For the performance function, the flight management system has various internal algorithms (hereinafter "performance algorithms") that utilize aerodynamic and propulsion performance data (hereinafter "baseline performance data") stored in a performance database to compute the predicted flight profile and the associated trip prediction parameters such as speed, altitude, estimated time of arrival (ETA) and the predicted fuel consumption. However, the airplane characteristics may vary over time due to small but incremental changes to the airplane aerodynamic and propulsion performance. For example, due to changes to an airframe, such as repairs, configuration changes, antennas, etc., and engine deterioration, the airplane fuel flow and drag characteristics change over time. As a result, the performance algorithms and the baseline performance data may deviate from the actual airplane performance over time as the airplane continues to operate in service. This creates a situation where airlines would like to update the performance database with up-to-date tables in a timely and efficient manner to reflect the true airplane performance.

Many airlines are looking to enhance fuel performance through extensive on-ground flight/fuel planning to reflect the true fuel flow and drag characteristics of individual airplanes. The performance database in the flight management system contains aerodynamics and propulsion data that is representative of a series of flight tests that usually occur in a controlled environment before the airplane is delivered to a customer airline. It is necessary to update the performance database with up-to-date tables in a timely and efficient manner to reflect the true airplane performance. Currently, it is not possible to update the performance database tables in the flight management system via datalink. In fact, the current FMS datalink cannot uplink or downlink any data in a tabular or polynomial (i.e., curve) format.

While the airplane is sitting on the ground, maintenance crew needs to send a performance database request downlink from the flight deck of the airplane to initiate the transfer of a new (i.e., updated) performance database into the flight management system. This usually increases time and labor costs for the airlines. The time window during which maintenance crew can enter the flight deck to load the new performance database into the flight management system is very limited.

It would be advantageous to provide a flight management system that is configured to incorporate performance tables that have been uploaded via the FMS datalink capability.

SUMMARY

The subject matter disclosed in detail below is directed to a flight management system which is capable of monitoring changes in airplane characteristics. The flight management system is configured with a datalink management function that enables the uploading of updated airplane performance table/curve data from a ground station via a datalink. (As used herein, the term "table/curve data" means data in either tabular or curve format.) Upon receipt of updated aerodynamic and propulsion performance data via the datalink, the flight management system creates or updates a set of airplane performance tables or curves in a database which can be utilized to compute more accurate flight profile and trip prediction parameters, such as estimated time of arrival and predicted fuel consumption quantity. This can reduce the cost associated with delivering up-to-date performance data to the flight management system.

More specifically, a system and a method are proposed herein which enable performance table/curve data to be uplinked into the flight management system so that up-to-date performance data can be quickly and efficiently deployed to the airplane. The datalink capability disclosed herein will be operationally similar to existing datalink capabilities. After the updated performance table/curve data has been uplinked to the flight management system, the pilot is able to review basic information about the new performance data tables or curves and accept or reject them on appropriate pages on a flight deck control display unit (hereinafter "CDU"). The CDU is an interface system that allows a pilot to monitor and control various other aircraft systems. The CDU is the primary interface for the aircraft's flight management system.

The storing of up-to-date performance data tables and/or curves benefits the flight management system by avoiding constant use of corrected or updated data by the performance algorithms to compute updated predicted airplane performance values. The correct predicted airplane performance values can simply be looked up in the data tables or curves, thus freeing up the FMS computing resources. This is also computationally efficient.

In accordance with some embodiments, a method is provided for automatically or manually sending a downlink request for updated performance table/curve data when the flight management system detects that predicted performance values computed based on the onboard performance tables do not match real time performance values. This can be based on a certain threshold (such as the deviation of a real-time measured airplane characteristic value from a predicted airplane characteristic value is equal to or greater than a specified threshold percentage) or a certain time period (such as at regular intervals of time or before every flight) that can be customized by different airlines.

In accordance with the same or different embodiments, a method is provided for uplinking data from a ground-based system to an airplane, which method uses an uplink message protocol to quickly and efficiently load performance tables (including values for two or more variables) or curves (including values for coefficients and exponents of multiple polynomials) into memory of the flight management system onboard the airplane. The flight crew can select to utilize the new values right away to take advantage of the updated performance tables/curves or wait until a later time. This recently received data uplink can be used for the current flight or can be stored in a non-transitory tangible computer-readable storage medium (e.g., memory) for later on multiple flights until the flight or maintenance crew decide to delete or update it.

In accordance with the same or different embodiments, a method is provided for selectively applying the updated performance tables or curves to different phases of flight. Unlike the existing flight management system datalink messages, wherein once accepted the entire set of data must be used by the flight management system, the flight crew can specify a subset of the flight plan where the updated performance tables or curves are applied. This is to provide additional flexibility in the way the flight crew controls the airplane and to provide a means to disable the updated performance tables or curves and revert to the baseline performance database in case the flight crew detects an error in them. Also, it gives the flight crew an opportunity to see real-time performance benefits that can be realized by using the updated performance tables or curves.

Although various embodiments of systems and methods for computing predicted flight profile and associated trip prediction parameters are disclosed in some detail below, one or more of those embodiments may be characterized by one or more of the following aspects.

One aspect of the subject matter disclosed in detail below is a method comprising the following steps performed onboard an airplane: (a) acquiring a real-time measured value of a trip parameter during a current or previous flight; (b) calculating a first predicted value of the trip parameter using at least performance data stored in a current performance table; (c) calculating a magnitude of a deviation of the real-time measured value from the first predicted value; (d) determining whether the magnitude of the deviation exceeds a specified threshold or not; and (e) sending a downlink request for updated performance data after a determination in step (d) that the magnitude of the deviation exceeds the specified threshold, wherein steps (a) through (d) are performed by a computer system onboard the airplane and step (e) is performed by a communications management unit onboard the airplane. This method may further comprise the following steps performed after step (e): (f) receiving an uplink message comprising updated performance data; and (g) populating the current performance table with the updated performance data to construct an updated performance table, wherein step (f) is performed by the communications management unit and step (g) is performed by the computer system. In accordance with some embodiments, the uplink message comprises updated performance table data representing updated performance tables and/or updated performance curve data representing updated performance curves. The pilot may accept or reject each individual updated performance table and/or curve by manipulating line select keys on the control display unit.

The method described in the preceding paragraph may further comprise: (h) specifying a start waypoint and an end waypoint of a flight segment; (i) calculating a second predicted value of the trip parameter using at least some of the updated performance data for a flight segment that starts at the start waypoint and ends at the end waypoint; and (j) displaying alphanumeric symbology representing the second predicted value, wherein step (h) is performed by a pilot using the control display unit, step (i) is performed by the computer system, and step (j) is performed by the control display unit.

Another aspect of the subject matter disclosed in detail below is a method comprising the following steps performed onboard an airplane: (a) sending a downlink request for updated performance data; (b) receiving an uplink message comprising updated performance data; (c) populating a current performance table with the updated performance data to construct an updated performance table; (d) calculating a first predicted value of a trip parameter using at least some of the updated performance data; and (e) displaying alphanumeric symbology representing the first predicted value, wherein steps (a) and (b) are performed by a communications management unit onboard the airplane, steps (c) and (d) are performed by a computer system onboard the airplane, and step (e) is performed by a control display unit onboard the airplane.

A further aspect of the subject matter disclosed in detail below is a system onboard an airplane, comprising a computer system and a communications management unit that communicates with the computer system, wherein the computer system is configured to: (a) acquire a real-time measured value of a trip parameter during a current or previous flight; (b) calculate a first predicted value of the trip parameter using at least performance data stored in a current performance table; (c) calculate a magnitude of a deviation of the real-time measured value from the first predicted value; (d) determine whether the magnitude of the deviation exceeds a specified threshold or not; and (e) instruct the communications management unit to send a downlink request for updated performance data in response to a determination in step (d) that the magnitude of the deviation exceeds the specified threshold without pilot intervention, and wherein the communication management unit is configured to send a downlink request for updated performance data in response to receipt of an instruction to send a downlink request from the computer system. This system further comprises a control display unit that communicates with the computer system, wherein: the communication management unit is further configured to receive an uplink message comprising updated performance data; the computer system is further configured to populate the current performance table with the updated performance data, calculate a second predicted value of a trip parameter using at least some of the updated performance data, and instruct the control display unit to display the second predicted value; and the control display unit is configured to display alphanumeric symbology representing the second predicted value in response to receipt of an instruction to display the second predicted value from the computer system. In accordance with some embodiments, the control display unit is further configured to communicate start and end waypoints input by a pilot to the computer system, and the computer system calculates the second predicted value of the trip parameter for a flight segment that starts at the start waypoint and ends at the end waypoint.

Other aspects of systems and methods for computing predicted flight profiles and associated trip prediction parameters are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of an improved avionics flight management system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

It is likely that an airplane's performance will not change overnight or even during several flights unless there has been some repair work or configuration changes to the airplane to change the performance characteristics. Rather, it is expected that the change will be gradual so that a ground-based system can collect the airplane performance data over time (for example, over the course of one month). Data collection can be done in multiple ways. For example, a maintenance crew can go to the airplane while on the ground and download the data. Or there can be a system that automatically sends out the data when the airplane pulls into the airport gate. Or the airplane can send out the data in real time. Then, using the data collected during this period, the ground-based system will analyze the performance data and generate updated tables or curves, which are stored in computer memory and ready for uploading. The new tables/curves may not reflect the current flight or even several previous flights, but still the new tables/curves should be very accurate since they reflect the data over a period of a month. Then, during one of the flights, when the flight management system detects that the real-time airplane performance consistently deviates too much from the expected airplane performance represented by the baseline performance database (already in the flight management system) or may be simply it has been a month since the last update, the flight management system sends a downlink to the ground-based system requesting that the updated tables/curves by uplinked to the airplane. Thus, it is not necessary for the ground-based system to know what the real-time airplane performance is. It simply responds to the request downlinked by the flight management system and uplinks the updated tables/curves to the airplane.

Figure 1:
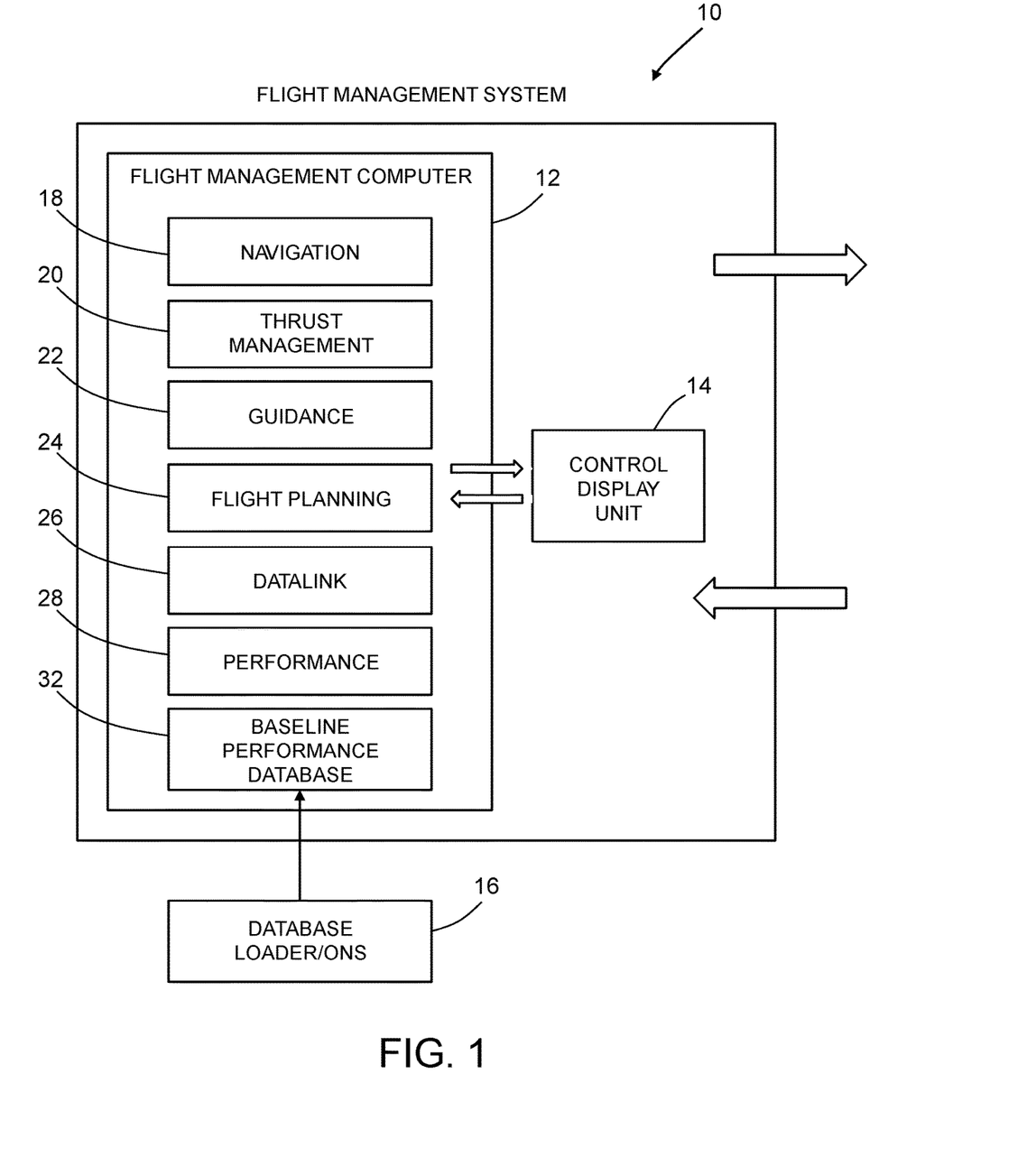
FIG. 1 is a block diagram showing an overall architecture of a typical flight management system.

FIG. 1 is a block diagram showing an overall architecture of a typical flight management system 10 of a type comprising one or more flight management computers and one or more control display units. Only one flight management computer 12 and one control display unit (CDU) 14 are depicted in FIG. 1. The CDUs are the primary interface between the flight management computer 12 and the pilots.

The computer code executed by the flight management computer (hereinafter "FMC software") may reside on respective core processors in respective airplane information management system (AIMS) cabinets. The FMC software may comprise the following: flight management functionality, a navigation function 18, a thrust management function 20, and a baseline performance database 32 (for example, an aero/engine database containing aerodynamic and propulsion data). The flight management functionality comprises guidance 22, flight planning 24, a datalink management function 26, a performance management function 28, CDU interfaces, an interface to the baseline performance database 32, and other functionalities. The navigation function 18 provides sensor selection (inertial, radio, satellite), position solution determination and other functionalities. The navigation function 18 computes airplane position, velocity, track angle and other airplane parameters, collectively termed airplane states, to support functions such as flight planning, guidance, and display as well as AIMS—external functions.

The flight management system 10 integrates information from an air data and inertial reference system, navigation sensors, engine and fuel sensors, and other airplane systems (not shown in FIG. 1), along with internal databases and crew-entered data to perform the multiple functions. The flight management computer may contain a navigation database (not shown in FIG. 1) and the baseline performance database 32.

For the performance management function 28, the flight management system 10 has various internal algorithms that utilize aerodynamic and propulsion performance data stored in the baseline performance database 32 to compute predicted flight profile and the associated trip prediction parameters such as ETA and predicted fuel consumption quantity. The performance management function 28 uses aerodynamic and propulsion models and optimization algorithms to generate a full flight regime vertical profile consistent with the performance mode selected and within flight plan constraints imposed by air traffic control. Inputs to the performance management function 28 include fuel flow, total fuel, flap position, engine data and limits, altitude, airspeed, Mach number, air temperature, vertical speed, progress along the flight plan and pilot inputs from the control display unit 14. The outputs are target values of Mach number, calibrated airspeed and thrust for optimum control of the airplane, and advisory data to the crew.

Various performance modes for each flight phase, such as economy climb, economy cruise and long-range cruise, may be selected by the pilot through the control display unit 14. Multiple performance modes may be specified for the cruise flight phase. The default mode is an economy profile with speed limited. Economy profiles are computed to optimize fuel or time costs as governed by a cost index factor.

The aerodynamic and propulsion models are used to generate an optimum vertical profile for the selected performance modes. If the autothrottle or autopilot is not engaged for automatic control of the performance management function 28, the pilot can manually fly the optimum speed schedule by referring to the control display unit 14 and to the airspeed bug on the speed tape.

In accordance with the embodiment depicted in FIG. 1, the baseline performance database 32 is loaded by a database loader 16 using an onboard network system (ONS in FIG. 1). The baseline performance database 32 contains pre-stored data for the aerodynamic model of the airplane as well as for the engine performance model and thrust rating model of the engines. The baseline performance database 32 is used by the performance management function 28 to compute real-time parameters such as speed limits and speed targets, and to perform predictive computations such as flight plan predictions. The baseline performance database 32 is also used by the thrust management function 20 to compute thrust limits.

Figure 2:
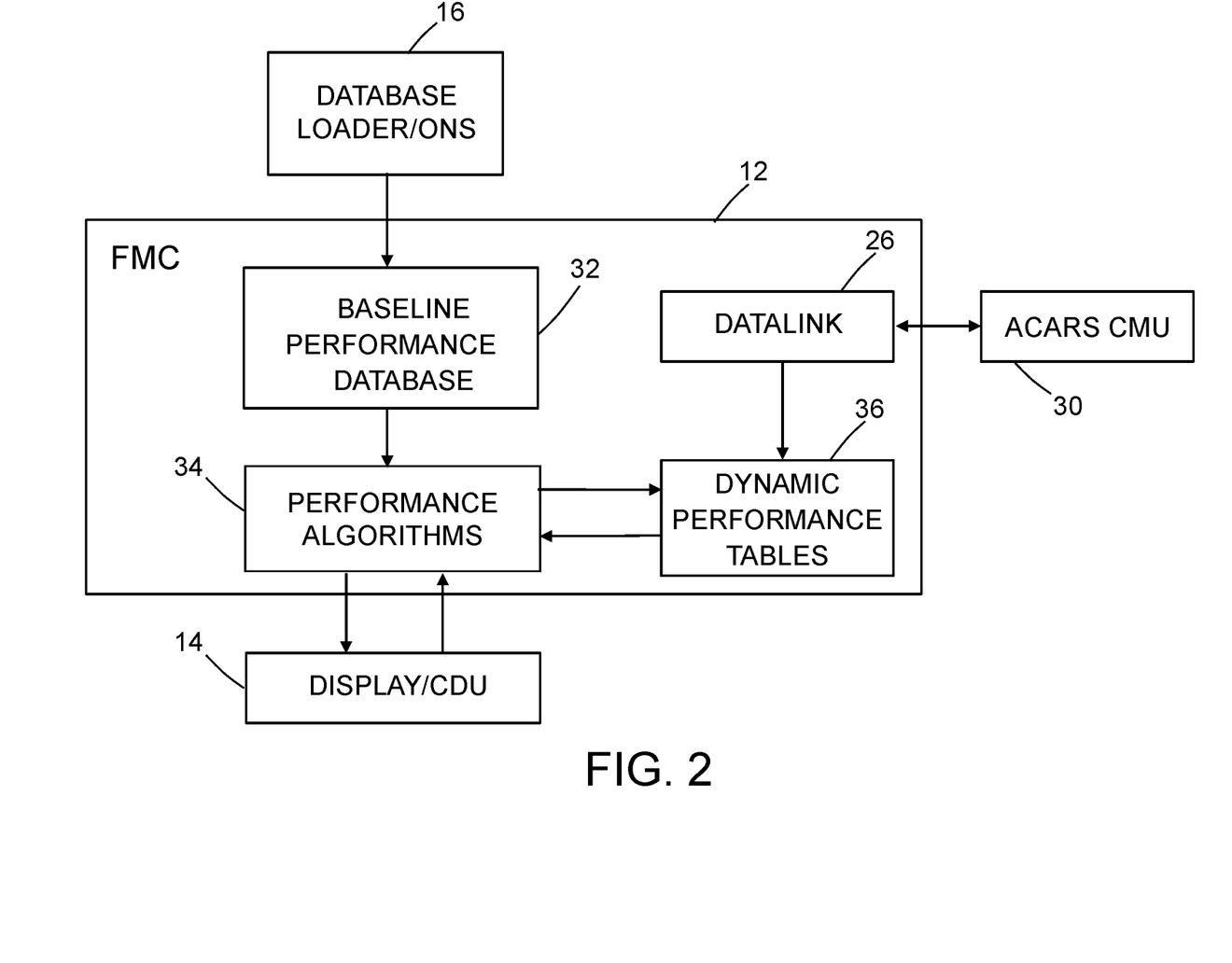
FIG. 2 is a block diagram identifying some components of a flight management system in accordance with one embodiment in which updated airplane performance table or curve data is received via a datalink.

The performance management function 28 depicted in FIG. 1 can be configured to execute a performance algorithm that creates and updates airplane performance data dynamically based on defined triggers, thereby enabling better utilization of computing resources in the flight management system. As shown in FIG. 2, baseline performance data can be loaded into a baseline performance database 32 by means of the database loader 16. The performance algorithms 34 then retrieve pertinent baseline performance data from the baseline performance database 32 and use it to compute a predicted trip parameter. The result of that computation is displayed on the control display unit 14 for viewing by the flight crew.

In accordance with the embodiments disclosed in detail herein, an improved flight management system can be provided with the capability to monitor changes in airplane characteristics such as fuel flow and drag. A flight management computer can be configured so that when a predetermined event is triggered, the flight management computer creates or updates a set of dynamic airplane performance data tables or curves which enable performance algorithms to utilize the latest fuel flow and drag data. Using the updated aerodynamic and propulsion performance data in the performance data tables, the flight management system is able to compute more accurate flight profile and trip prediction parameters such as estimated time of arrival and predicted fuel consumption quantity.

The performance data table input/output definition can be contained within the flight management system or within other loadable databases or in other existing data tables. The performance data tables with the updated data for the performance functions can be offloaded outside of the flight management system to other systems via physical or wireless connections and can be made available for further analysis.

FIG. 2 identifies some components of a flight management system in accordance with one embodiment in which performance tables 36 reside within the flight management computer 12 and are updated via a digital datalink system. The digital datalink system transmits short messages between airplanes and ground stations. A frequently used digital datalink system that is suitable for performing the datalink functions disclosed herein is the Aircraft Communications Addressing and Reporting System (ACARS). For the purpose of illustration, an example datalinking method that uses ACARS will be disclosed. Any other suitable airplane datalink technology could be used (e.g., via satellite).

The portion of the ACARS system which is onboard an airplane typically comprises a communications management unit (CMU) 30 (see FIG. 2) that hosts Aeronautical Operational Control applications used for communication between an airplane and a ground station. The CMU 30 provides a platform for an FMS-hosted AOC datalink, allowing two-way communication of flight plans, wind data and more. In accordance with the embodiments disclosed herein, the CMU 30 is also utilized to enable two-communication between a ground station having a computer system that generates updated airplane performance table or curve data and an airplane having a flight management system that uses such updated airplane performance table or curve data.

Each uplinked message containing updated airplane performance table or curve data (generated by a ground station) is received by the CMU 30. The datalink management function 26 is configured to interface with the CMU 30 and with performance tables 36. The datalink management function 26 is further configured to populate the performance tables 36 with uplinked performance data in response to control signals (not shown in FIG. 2) representing commands input into the CDU 14 by the pilot.

Once the performance tables 36 have been populated, they are used by the performance algorithms 34. As shown in FIG. 2, there are two-way communications between the performance algorithms 34 and the performance tables 36. Also there are two-way communications between the performance algorithms 34 and the CDU 14. Thus the pilot now has a capability to use the baseline performance database 32 either alone or in conjunction with the performance tables 36 for more accurate prediction computation.

In accordance with some embodiments, a method is provided for automatically or manually sending a downlink request for updated performance tables when the flight management system 10 detects that predicted performance values computed based on the onboard performance tables do not match real time performance values. This can be based on a certain threshold (such as the deviation of a measured airplane characteristic value from an estimated airplane characteristic value is equal to or greater than a specified threshold percentage) or a certain time period (such as at regular intervals of time or before every flight) that can be customized by different airlines.

If the difference exceeds a certain threshold (for example, 1% threshold in fuel flow) that can be specified by an airline for several flights, the flight management system 10 can either automatically send a downlink request for newer (i.e., updated) performance tables or the flight management system 10 can display a request field on a CDU page prompting the flight crew to make a decision on sending the downlink request. In the alternative, a request field can be displayed at all times so that the pilot can make the decision anytime. Instead of the threshold, the flight management system can be configured to send the downlink request every 30 days to be coincident with the NDB cycle.

In accordance with some embodiments of the improved system proposed herein, the flight management system can be configured by the pilot using the CDU 14 to input specified threshold percentages for various performance factors, such as fuel flow, drag coefficient and duration.

Figure 3:
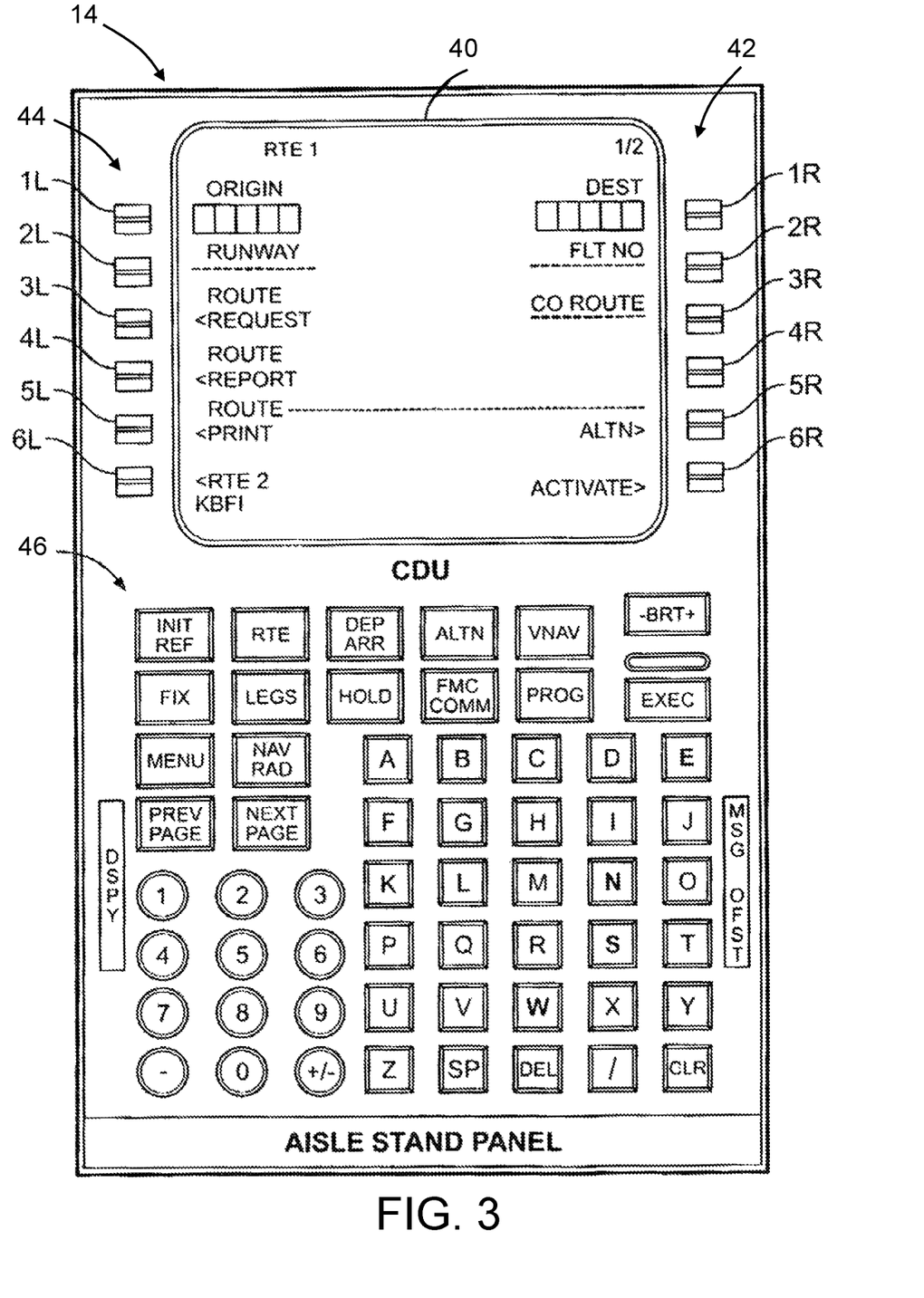
FIG. 3 is a diagram representing a front view of a control display unit for a commercial aircraft.

FIG. 3 is a diagram representing a front view of a CDU 14 for a commercial aircraft. The CDU 14 has a liquid crystal display (LCD) screen 40 and a keypad 46. Keypad 46 includes CDU page keys, alphanumeric entry keys, and various CDU display function keys. The LCD screen 40 can have at least one entry field, a plurality of display lines, and a plurality of line select keys corresponding to display lines. A typical CDU 14 includes twelve display lines and twelve line select keys, a set 44 of six on the left and a set 42 of six on the right. The line select keys to the left of the LCD screen 40 are respectively identified by the designations 1L through 6L, while the line select keys to the right of the LCD screen 40 are respectively identified by the designations 1R through 6R. The entry field for the depicted CDU 14 is below the twelfth display line and is commonly referred to as the "scratchpad". The scratchpad is a buffer to hold all data for review prior to executing the input. As data is keyed into the CDU 14 with the keypad 46, the entered values are displayed within the scratchpad field at the bottom of the LCD screen 40. The conventional method of entering and displaying information on the CDU requires multiple inputs by the pilot. The pilot first enters the information into the scratchpad entry field using the keypad 46 and then presses one of the line select keys associated with the display line where the entered information is to be displayed.

The labeled function keys of keypad 46 are used to call up specific top-level pages of the CDU 14 and to simultaneously dedicate the line select keys to the functions indicated on that page. Some functions, which are less frequently used in flight, are accessed through the index and flight plan edit function keys and then via line select keys 1L-6L and 1R-6R on the respective menu page. The line select keys 1L-6L and 1R-6R can be used to access lower level pages, toggle modes of the function, enter data in the associated field, or copy data in the scratchpad. When undefined line select keys are pressed, no operation is performed and no annunciation is displayed.

Figure 4:
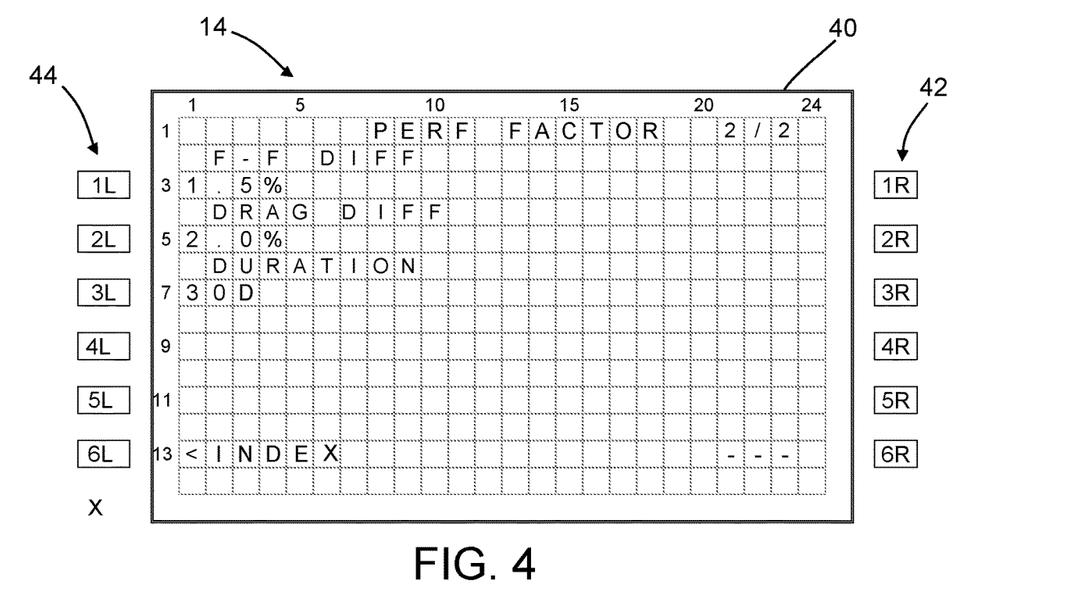
FIG. 4 is a diagram representing a CDU page showing various settable performance factors (namely, fuel flow threshold, drag threshold and duration) that can be used to automatically or manually send a downlink request for updated airplane performance table or curve data.

FIG. 4 is a diagram representing only the LCD screen 40 and respective sets 42, 44 of line select keys (individually marked 1L-6L and 1R-6R) of the CDU 14. The PERF FACTOR CDU page being displayed on LCD screen 40 in this example includes a fuel flow threshold setting, a drag coefficient threshold setting and a duration setting. The numeric values for these settings are entered separately on the scratchpad using the numeric keys of the keypad 46 (see FIG. 3). Then the desired display line is selected using the appropriate line select key 1L, 2L or 3L. These settings establish respective specified thresholds that can be used to trigger automatic or manual transmission of a downlink request for updated airplane performance table or curve data when the specified threshold is exceeded. In the example depicted in FIG. 4, a downlink request for updated performance data will be sent in response to: (a) the deviation of a corrected fuel flow from a current fuel flow becoming equal to or greater than the specified threshold of 1.5%; (b) the deviation of a corrected drag coefficient from a current drag coefficient becoming equal to or greater than the specified threshold of 2.0%; or (c) the expiration of 30 days since the most recent data uplink.

Figure 5:
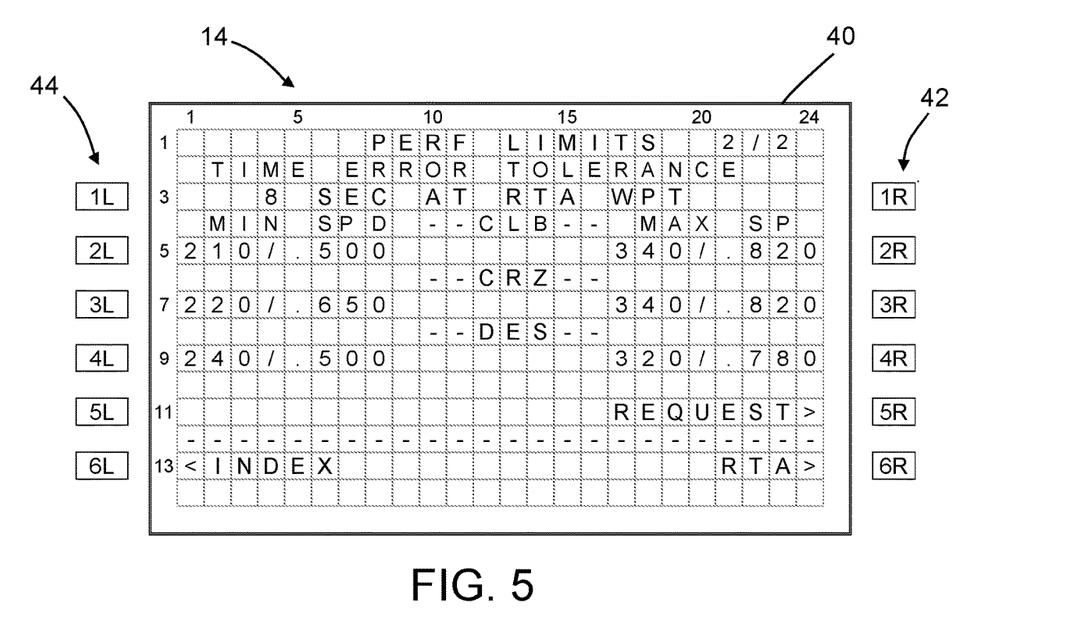
FIG. 5 is a diagram representing a CDU page showing the request field on line select key 5R which is used by the flight crew to manually send the downlink request for updated airplane performance table or curve data. This field may be displayed only when one of the conditions displayed in FIG. 4 has been met.

When any one of the pre-set conditions displayed in the PERF FACTOR CDU page depicted in FIG. 4 is met, the CDU page depicted in FIG. 5 will be displayed on the LCD screen 40. This CDU page can be accessed by the pilot anytime. The PERF LIMITS CDU page being displayed on LCD screen 40 in this example includes time error tolerance (in this example, 8 sec at the required time of arrival (RTA) waypoint (WPT)) and the minimum and maximum speeds for the flight phases climb (CLB), cruise (CRZ) and descent (DES). This CDU page also shows a request field indicating that the line select key 5R can be pressed by the flight crew to manually send the downlink request for updated airplane performance table or curve data. In response to depression of the line select key 5R when the PERF LIMITS CDU page is being displayed, the datalink management function 26 instructs the CMU 30 to send the downlink request to the ground station. Alternatively, the flight management computer 12 may be programmed so that the datalink management function 26 automatically instructs the CMU 30 to send the downlink request when one of the thresholds has been exceeded.

In accordance with the embodiments disclosed herein, a method is provided for uplinking data from a ground station to an airplane, which method uses an uplink message protocol to quickly and efficiently load performance tables (including values for two or more variables) or curves (including values for coefficients and exponents of multiple polynomials) into the flight management system 10. The airlines are already utilizing various flight management system datalink messages to upload flight plan, wind, takeoff data, and alternate airports, and the uplink message containing updated performance table or curve data will be operationally similar to existing datalink messages.

In accordance with one embodiment of the flight management system 10, there are two ways to uplink the new performance data. In accordance with a first protocol, a performance table uplink provides the capability for uplinking performance table data to the flight management system 10. The uplinked performance table data is stored in a non-transitory tangible computer-readable storage medium in a performance table format (having two or more dimensions) so that the values can be looked up and used in an efficient manner by the flight management system 10 for performance computations such as trip prediction. In accordance with a second protocol, a performance table curve uplink provides the capability for uplinking performance table curve data to the flight management system 10. The uplinked performance table data is stored in a non-transitory tangible computer-readable storage medium in a performance table curve format.

In accordance with the first protocol, a performance table uplink provides the capability for uplinking performance table data to the flight management system 10. Each performance table message starts with the text string PET/PT for message identification followed by a series of imbedded element identifiers which name each variable (i.e., parameter type) that forms a dimension of the performance data table. (For example, if the number of variables is N, then the performance data table will have N dimensions.) The imbedded element identifiers in the message are followed by data representing the respective number of values included in the performance table data for each variable. The remainder of the message is constituted by the respective sets of values for each variable. In this case, the flight management system is configured to check whether the number of values for each variable is the same. The flight management system performs this check at the time the message is loaded. If the number of values for each variable are not the same, then the flight management system rejects the message before the pilot can review the data.

The performance table uplink provides the capability for uplinking performance table data to the flight management system 10. The uplinked performance table data can be processed at any flight phase. In accordance with one implementation, all performance table messages start with PET/PT for the message identification followed by the imbedded element identifiers. The performance table message format for a two-dimensional (2-D) performance table is as follows:

PET/PT, NameX, NameZ, nX, mZ, X1, X2, . . . , Xn, Z1, Z2, . . . , Zm where NameX is the name of variable X; NameZ is the name of variable Z; nX is the number of values of the X variable; mZ is the number of values of the Z variable; X1, X2, . . . , Xn are the respective values of the X variable; and Z1, Z2, . . . , Zm are the respective values of the Z variable. In this case, the number of values of the X variable and the number of values of the Z variables must match (i.e., n=m). The flight management system 10 performs this check at the time when the message is loaded. If the numbers are not the same, then the message is rejected before the pilot can review the data.

The performance table message format for a 3-D performance table is as follows:

PET/PT, NameX, NameY, NameZ, nX, mY, pZ, X1, X2, . . . , Xn, Y1, Y2, . . . , Ym, Z1, Z2, . . . , Zp where NameX is the name of variable X; NameY is the name of variable Y; NameZ is the name of variable Z; nX is the number of values of the X variable; mY is the number of values of the Y variable; pZ is the number of values of the Z variable; X1, X2, . . . , Xn are the respective values of the X variables; Y1, Y2, . . . , Yn are the respective values of the Y variables; and Z1, Z2, . . . , Zp are the respective values of the Z variables. In this case, the product of the number of values of the X variable and the number of values of the Y variable must equal the number of values of the Z variable (i.e., n*m=p). The flight management system 10 performs this check at the time when the message is loaded. If the numbers are not the same, then the message is rejected before the pilot can review the data.

The above-described message format can be extended to contain the data for a performance table in any dimension. For example, in the case of a 4-D performance table having W, X, Y and Z variables, the number of values of the X variable multiplied by the number of values of the Y variable multiplied by the number of values of the W variable must equal the number of values of the Z variable.

In accordance with a second protocol, a performance curve uplink provides the capability for uplinking performance curve data to the flight management system 10. The uplinked performance curve data can be processed at any flight phase. The curves are constructed at a ground station based on empirical or simulated data in a table. For each curve, a polynomial that best fits the curve is calculated. As used herein, the term "polynomial" means a mathematical expression consisting of variables and coefficients and involving only the operations of addition, subtraction, multiplication, and non-negative integer exponents of variables. For example, the polynomial may take the following form:

$$f(x) = a_0 x^0 + a_1 x^1 + a_2 x^2 + a_3 x^3 + \ldots$$

In accordance with one implementation, a message is constructed (at the ground station) that includes the coefficients $a_0$, $a_1$, $a_2$, etc. and the exponents 0, 1, 2, 3, etc. arranged in accordance with a performance curve message format.

In accordance with one implementation, all performance curve messages start with PTC/PT for the message identification followed by the imbedded element identifiers. The performance table message format for a set of 2-D performance curves (e.g., a set of curves for different corrected cost index values, wherein the X-axis represents weight/delta (WOD) and the Y-axis represents economy cruise speed (Mach) table) is as follows:

PTC/PC, nP, mC, a0, a1, a2, . . . , aN, x0, x1, x2, . . . , xN, b0, b1, b2, . . . , bN, y0, y1, y2, . . . , yN, . . .

where nP is the order of the polynomials; mC is the number of curves; a0, a1, a2, . . . , aN are the coefficients for the first curve fit; x0, x1, x2, . . . , xN are the exponents for the first curve fit; b0, b1, b2, . . . , bN are the coefficients for the second curve fit; y0, y1, y2, . . . , yN are the exponents for the second curve fit; and so forth for the third, fourth, etc. curve fits. In this case, the number of each set of coefficients and exponents for the curve fitting must match (i.e., be equal) the order of the polynomials plus one. The flight management system 10 performs this check at the time when the message is loaded. If the numbers do not match, then the message is rejected before the pilot can review the data.

Figure 6:
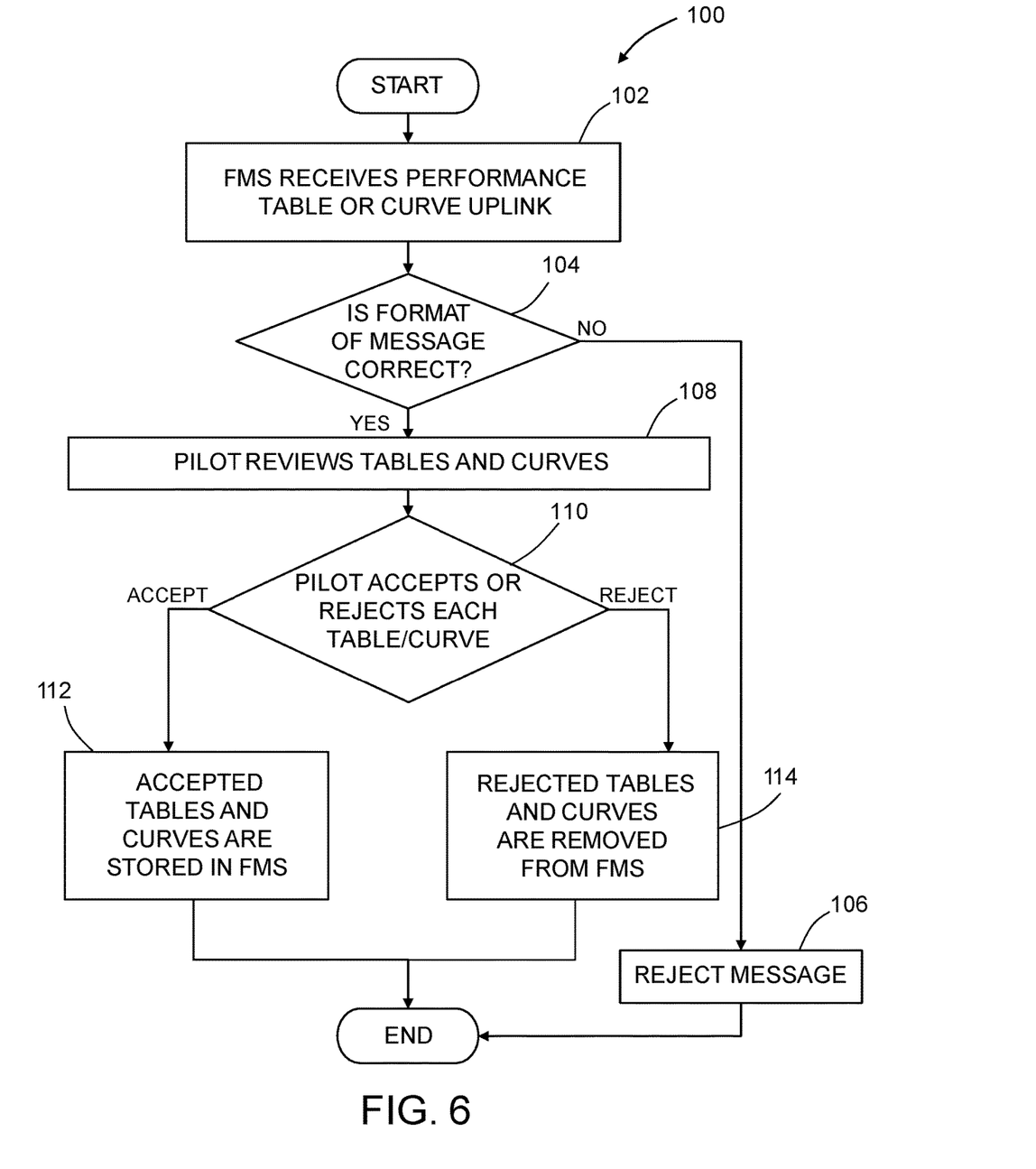
FIG. 6 is a flowchart identifying steps of an algorithm for accepting or rejecting uplinked tables or curves in accordance with one embodiment, including some steps performed by the flight management system decision logic.

FIG. 6 is a flowchart identifying steps of an algorithm 100 for accepting or rejecting uplinked tables or curves in accordance with one embodiment, including some steps performed by FMS decision logic in the performance algorithms 34 and some steps performed by the pilot. The updated performance data contained in the uplink message is received by the flight management system 10 (step 102). The FMS decision logic is configured to determine whether the format of the message is correct or not (step 104), e.g., in the case of uplinked performance table data, does the number of X variables equal the number of Z variables, or in the case of uplinked performance curve data, does the number of each set of coefficients and exponents equal the order of the polynomial plus one. On the one hand, if the FMS decision logic determines that the message is not correct, then the message is rejected (step 106). On the other hand, if the FMS decision logic determines that the message is correct, then the message is not rejected. In the latter case, the flight crew is able to review the basic information about the new performance tables/curves (step 108) and accept or reject them on appropriate CDU pages (step 110). In this fashion, the performance tables or curves can be quickly and efficiently loaded into the flight management system 10. More specifically, the FMS decision logic is configured to determine whether the pilot has accepted or rejected the uplinked table or curve. On the one hand, if the pilot accepted a particular table or curve, the FMS decision logic stores the accepted table or curve in the performance tables 36 along with other tables and curves (step 112). On the other hand, if the pilot rejected a particular table or curve, the FMS decision logic removes (i.e., deletes) the rejected table or curve from the memory device where it is being temporarily stored in the flight management system (step 114).

Figure 7:
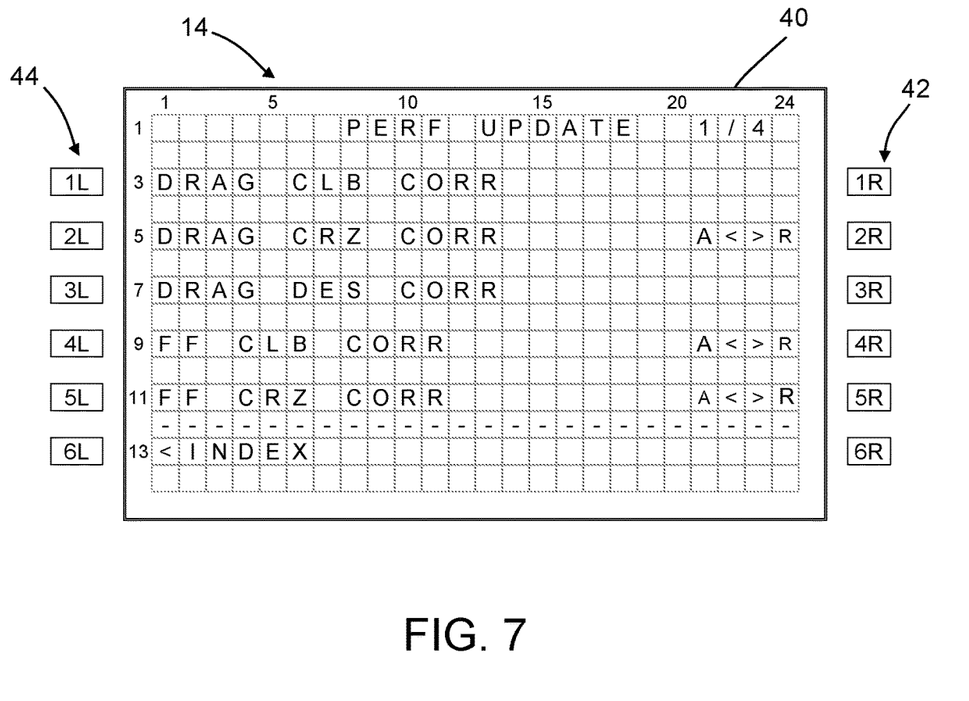
FIG. 7 is a diagram representing a CDU page showing a list of the uplinked airplane performance tables or curves, which list is used by the flight crew to individually accept or reject each uplinked airplane performance table or curve.

FIG. 7 is a diagram representing a CDU page showing a portion of a list of airplane performance tables which have been uplinked but not yet accepted by the flight crew. This CDU page is named "PERF UPDATE". In this example, the listed tables contain correction factors that can be applied to the baseline performance data. Other tables (e.g., tables named ECON CLB SPD, ECON CRZ SPD and ECON DES SPD), which may be listed on the next CDU page (not shown), can be used to "replace" corresponding tables in the baseline performance data. Thus the flight management computer can "revert" to the baseline performance data by not applying any correction factors to the baseline performance data (this is identical to applying factors equal to zero) or by just ignoring the uplinked tables by using the tables in the baseline performance data.

Referring still to FIG. 7, the flight crew can interact with the CDU 14 to individually accept or reject each uplinked airplane performance table or curve listed on the PERF UPDATE page. For the individual uplinked performance tables/curves, the flight crew can use the line select keys 1L-6L and 1R-6R to toggle between accept (A) and reject (R) to store in the flight management system 10 or to remove from the flight management system 10. The selection (A or R) is indicated on the CDU page by using a relatively larger font size to display the letter representing the option selected (e.g., A) and a relatively smaller font size to display the letter representing the option not selected (e.g., R). For the tables and curves that are not included in the uplinked message, the toggle is not available.

The flight crew can select to utilize the new values right away to take advantage of the performance tables 36 or wait until a later time. Depending on the flight crew's selection, the performance data in the uplink message can be used during the current flight or can be stored in a non-transitory tangible computer-readable storage medium (e.g., memory) for later use on multiple flights until the flight or maintenance crew decide to delete or update it.

Figure 8:
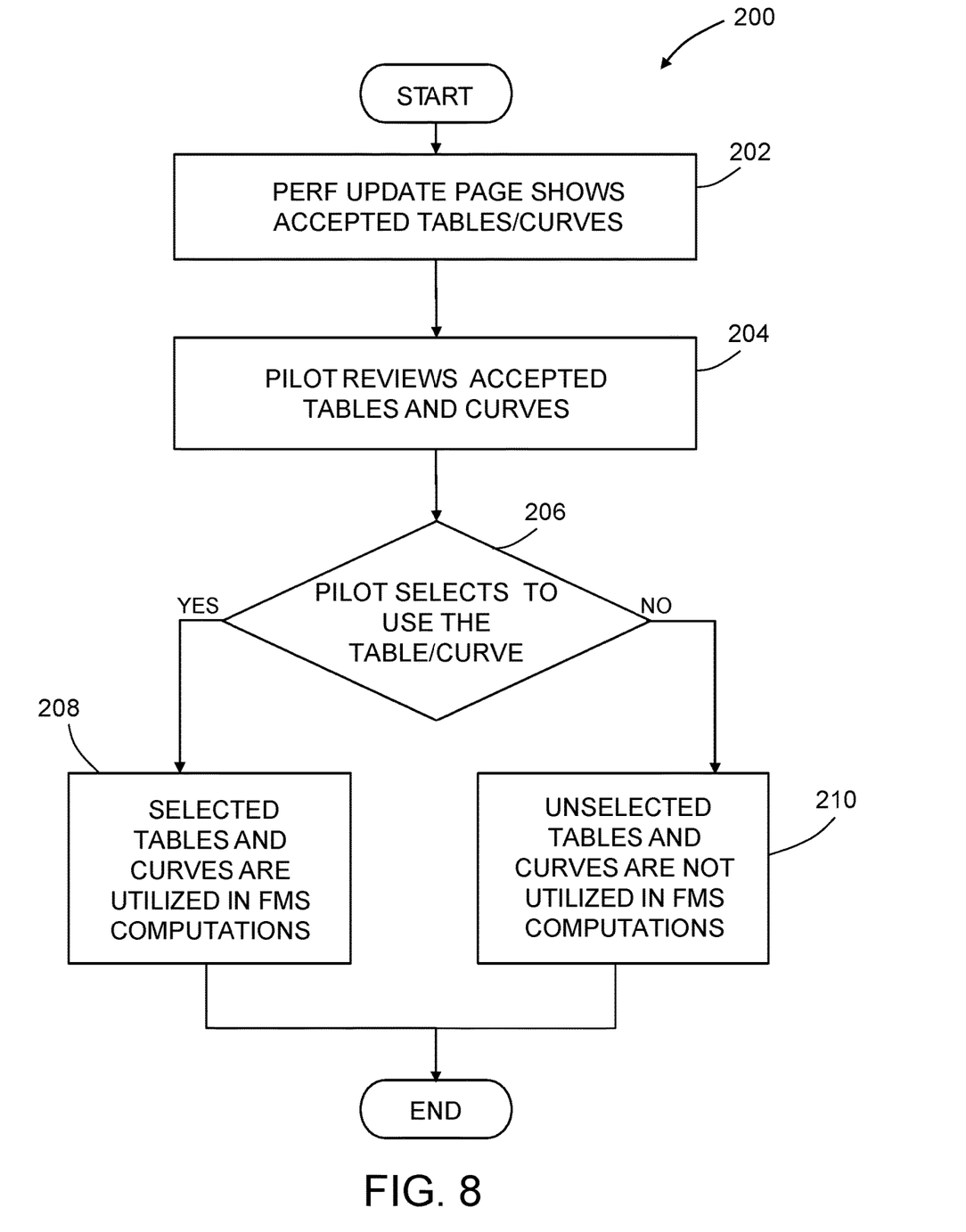
FIG. 8 is a flowchart identifying steps of an algorithm for selecting which accepted tables or curves are to be utilized by the flight management system in accordance with one embodiment, including some steps performed by the flight management system decision logic.

FIG. 8 is a flowchart identifying steps of an algorithm for selecting which accepted tables or curves are to be utilized by the flight management system in accordance with one embodiment, including some steps performed by the FMS decision logic and some steps performed by the pilot. The accepted tables and curves are listed on the PERF UPDATE page (step 202). The pilot is able to review basic information about the accepted tables and curves (step 204) by navigating to the appropriate CDU page. In addition, the flight crew can toggle between Yes (Y) and No (N) for each display line using the line select keys to select which of the accepted tables and curves the flight management system 10 should use or not use (step 206). On the one hand, if the pilot selects a particular table or curve for use, the selected table or curve will be utilized in FMS computations (step 208). On the other hand, if the pilot does not select a particular table or curve for use, the selected table or curve will not be utilized in FMS computations (step 210).

Figure 9:
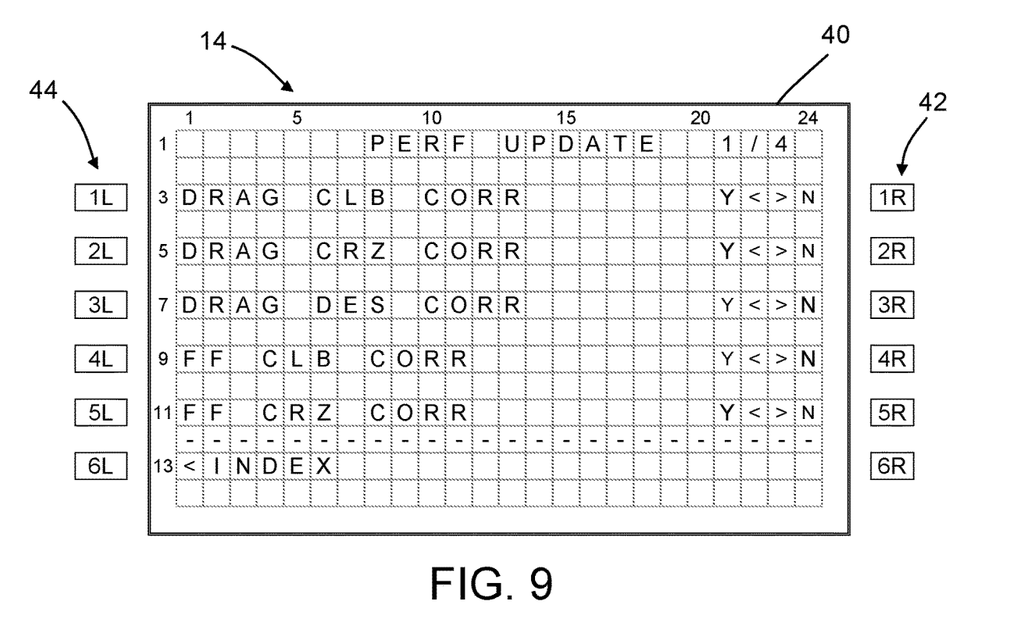
FIG. 9 is a diagram representing a CDU page showing a list of the accepted airplane performance tables or curves, which list is used by the flight crew to individually select which accepted airplane performance tables or curves will be utilized by the flight management system.

FIG. 9 is a diagram representing the PERF UPDATE CDU page showing a list of accepted airplane performance tables or curves, which is used by the flight crew to individually select which accepted airplane performance tables or curves will be utilized by the flight management system 10. For the individual uplinked performance tables/curves, the flight crew can use the line select keys 1L-6L and 1R-6R to toggle between Yes (Y) and No (N) to select which of the accepted tables and curves the flight management system 10 should use or not use. The selection (Y or N) is indicated on the CDU page by using a relatively larger font size to display the letter representing the option selected (e.g., Y) and a relatively smaller font size to display the letter representing the option not selected (e.g., N).

In accordance with a further aspect of the embodiment of a flight management system 10 described above with reference to FIGS. 4-9, the updated performance tables or curves loaded into the performance tables 36 (see FIG. 2) can be selectively applied to different phases of flight. The flight crew can specify a subset of the flight plan where the performance tables 36 are to be applied. This provides additional flexibility in the way the flight crew controls the airplane and further provides means for disabling the performance tables 36 and reverting to the baseline performance database 32 in case the flight crew detects an error in them. Also, it gives the flight crew an opportunity to see real-time performance differences that can be realized by using the updated performance tables or curves.

Figure 10:
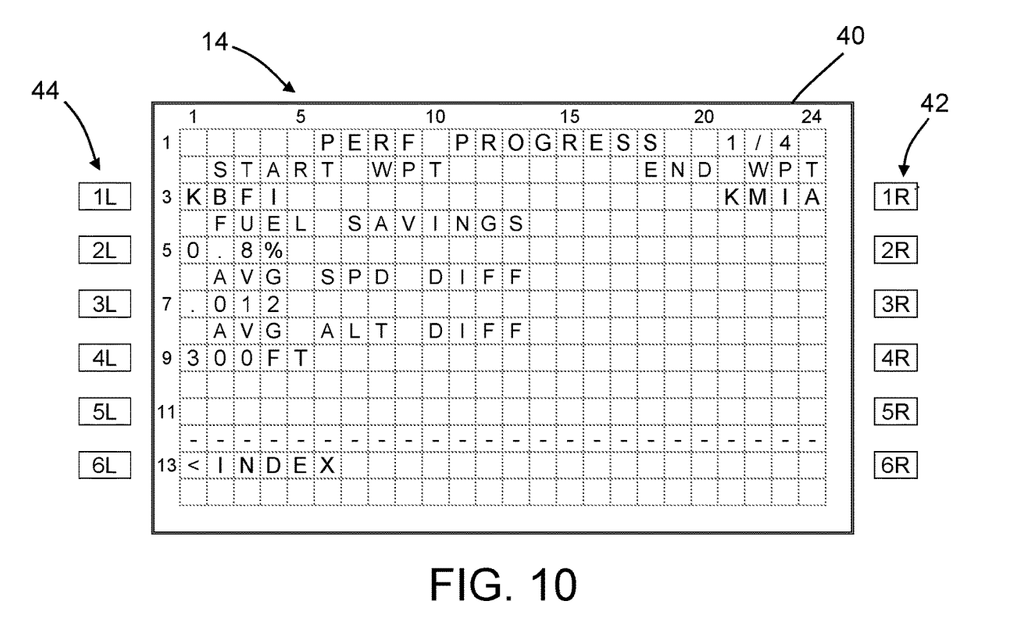
FIG. 10 is a diagram representing a CDU page that allows the flight crew to specify the start and end waypoints for using the airplane performance tables or curves selected using the CDU page depicted in FIG. 9.

FIG. 10 is a diagram representing a CDU page named PERF PROGRESS that allows the flight crew to specify the start and end waypoints of a flight segment during which the selected airplane performance tables or curves may be used. The start and end waypoints may be in the same flight phase or different flight phases. In the example depicted in FIG. 10, the start waypoint is KBFI and the end waypoint is KMIA. Multiple flight segments can be specified on additional pages. The PERF PROGRESS CDU page also displays the relative performance differences realized by using the updated tables during the flight segment specified by the start and end waypoints. In the example depicted in FIG. 10, the predicted fuel savings were 0.8%, the predicted average speed difference was 0.012, and the predicted average altitude difference was 300 feet.

In summary, the system depicted in FIG. 2 comprises a flight management computer 12, a control display unit 14 that communicates with the flight management computer 12 and a communications management unit 30 that communicates with the flight management computer 12. In accordance with one embodiment, the flight management computer is configured to: (a) acquire a real-time measured value of a trip parameter during flight; (b) calculate a first predicted value of the trip parameter using at least performance data stored in a current performance table; (c) calculate a magnitude of a deviation of the real-time measured value from the first predicted value; (d) determine whether the magnitude of the deviation exceeds a specified threshold or not; and (e) instruct the communications management unit to send a downlink request for updated performance data in response to a determination in step (d) that the magnitude of the deviation exceeds the specified threshold without pilot intervention. The communication management unit 30 is configured to send a downlink request for updated performance data in response to receipt of an instruction to send a downlink request from the flight management computer 12 and receive an uplink message comprising updated performance data. The flight management computer 12 is further configured to populate the current performance table with the updated performance data, calculate a second predicted value of a trip parameter using at least some of the updated performance data, and instruct the control display unit 14 to display the second predicted value. The control display unit 14 is configured to display alphanumeric symbology representing the second predicted value in response to receipt of the instruction to display the second predicted value from the flight management computer 12. In addition, the control display unit 14 is further configured to communicate start and end waypoints input by a pilot to the flight management computer 12, and the flight management computer 12 calculates the second predicted value of the trip parameter for a flight segment that starts at the start waypoint and ends at the end waypoint.

While apparatus and methods for uplinking updated performance data to a flight management system and then computing a predicted flight profile and associated trip prediction parameters have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising at least a processing unit (e.g., a central processing unit, an integrated circuit or an arithmetic logic unit).

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method comprising the following steps performed onboard an airplane:
   (a) acquiring a real-time measured value of a trip parameter during a flight;
   (b) calculating a first predicted value of the trip parameter using at least aerodynamic and propulsion performance data stored in a current performance table;
   (c) after steps (a) and (b) have been performed, calculating a magnitude of a deviation of the real-time measured value from the first predicted value;
   (d) after step (c) has been performed, determining whether the magnitude of the deviation exceeds a specified threshold or not; and
   (e) sending a downlink request for updated aerodynamic and propulsion performance data after a determination in step (d) that the magnitude of the deviation exceeds the specified threshold,
   wherein steps (a) through (d) are performed by a computer system onboard the airplane and step (e) is performed by a communications management unit onboard the airplane.

2. The method as recited in claim 1, further comprising setting the specified threshold manually using a control display unit onboard the airplane.

3. The method as recited in claim 2, further comprising instructing the communications management unit to perform step (e), wherein the instructing step is performed by the computer system in response to a determination in step (d) that the magnitude of the deviation exceeds the specified threshold without pilot intervention.

4. The method as recited in claim 2, further comprising:
   (f) displaying a request field on a screen of the control display unit in response to a determination in step (d) that the magnitude of the deviation exceeds the specified threshold; and
   (g) manipulating a line select key of the control display unit associated with the request field,
   wherein step (e) is performed automatically in response to step (g).

5. The method as recited in claim 1, further comprising the following steps performed after step (e):
   (f) receiving an uplink message comprising updated aerodynamic and propulsion performance data in a tabular or polynomial format; and
   (g) determining whether the tabular or polynomial format of the uplink message is correct or not,
   wherein step (f) is performed by the communications management unit and step (g) is performed by the computer system.

6. The method as recited in claim 5, wherein the updated aerodynamic and propulsion performance data is in the tabular format and comprises a first number of values of a first variable and a second number of values of a second variable, and step (g) comprises determining whether the first and second numbers are equal.

7. The method as recited in claim 5, wherein the updated aerodynamic and propulsion performance data is in the polynomial format and comprises a first number of sets of coefficients and a second number of sets of exponents of a multiplicity of polynomials, and step (g) comprises determining whether both of the first and second numbers are equal to the order of the polynomials plus one.

8. The method as recited in claim 5, wherein the updated aerodynamic and propulsion performance data is in the tabular format and comprises a respective number of values of three of more variables, and step (g) comprises determining whether the number of values of one of the three or more variables is equal to the product of the number of values of the other of the three or more variables.

9. The method as recited in claim 1, further comprising the following steps performed after step (e):
   (f) receiving an uplink message comprising updated aerodynamic and propulsion performance data, wherein the updated aerodynamic and propulsion performance data comprises updated performance table data representing updated performance tables and/or updated performance curve data representing updated performance curves; and
   (g) accepting or rejecting each individual updated performance table and/or curve, wherein the accepting or rejecting step is performed by the pilot manipulating line select keys on the control display unit.

10. The method as recited in claim 9, further comprising selecting which of the accepted updated performance tables and/or curves should be utilized by the flight management system, wherein the selecting step is performed by the pilot manipulating line select keys on the control display unit.

11. The method as recited in claim 1, further comprising the following steps performed after step (e):
   (f) receiving an uplink message comprising updated aerodynamic and propulsion performance data; and
   (g) populating the current performance table with the updated aerodynamic and propulsion performance data to construct an updated performance table,
   wherein step (f) is performed by the communications management unit and step (g) is performed by the computer system.

12. The method as recited in claim 11, further comprising:
   (h) specifying a start waypoint and an end waypoint of a flight segment;
   (i) calculating a second predicted value of the trip parameter using at least some of the updated aerodynamic and propulsion performance data for a flight segment that starts at the start waypoint and ends at the end waypoint; and (j) displaying alphanumeric symbology representing the second predicted value, wherein step (h) is performed by a pilot using the control display unit, step (i) is performed by the computer system, and step (j) is performed by the control display unit.

13. A method comprising the following steps performed onboard an airplane:

(a) sending a downlink request for updated aerodynamic and propulsion performance data;

(b) after step (a) has been performed, receiving an uplink message comprising updated aerodynamic and propulsion performance data;

(c) after step (b) has been performed, populating a current performance table with the updated aerodynamic and propulsion performance data to construct an updated performance table;

(d) after step (c) has been performed, calculating a first predicted value of a trip parameter using at least some of the updated aerodynamic and propulsion performance data that is populating the updated performance table; and (e) after step (d) has been performed, displaying alphanumeric symbology representing the first predicted value, wherein steps (a) and (b) are performed by a communications management unit onboard the airplane, steps (c) and (d) are performed by a computer system onboard the airplane, and step (e) is performed by a control display unit onboard the airplane.

14. The method as recited in claim 13, further comprising specifying a start waypoint and an end waypoint of a flight segment, wherein the predicted value is calculated in step (d) for a flight segment that starts at the start waypoint and ends at the end waypoint, and the specifying step is performed by a pilot using the control display unit.

15. The method as recited in claim 13, wherein the updated aerodynamic and propulsion performance data comprises updated performance table data representing updated performance tables and/or updated performance curve data representing updated performance curves, further comprising:

(f) determining whether a format of each individual updated performance table and/or curve is correct or not; and (g) accepting or rejecting each individual updated performance table and/or curve having a correct format, wherein step (f) is performed by the computer system and step (g) is performed by a pilot manipulating line select keys on the control display unit.

16. The method as recited in claim 13, further comprising the following steps performed before step (a):

(f) acquiring a real-time measured value of the trip parameter during flight;

(g) calculating a second predicted value of the trip parameter using at least aerodynamic and propulsion performance data stored in the current performance table;

(h) after steps (f) and (g) have been performed, calculating a magnitude of a deviation of the real-time measured value from the second predicted value;

(i) after step (h) has been performed, determining whether the magnitude of the deviation exceeds a specified threshold or not, wherein steps (f) through (i) are performed by the computer system.

17. The method as recited in claim 16, further comprising setting the specified threshold manually using the control display unit.

18. A system onboard an airplane, comprising a computer system and a communications management unit that communicates with the computer system, wherein the computer system is configured to:

(a) acquire a real-time measured value of a trip parameter during a flight;

(b) calculate a first predicted value of the trip parameter using at least aerodynamic and propulsion performance data stored in a current performance table;

(c) after steps (a) and (b) have been performed, calculate a magnitude of a deviation of the real-time measured value from the first predicted value;

(d) after step (c) has been performed, determine whether the magnitude of the deviation exceeds a specified threshold or not; and (e) instruct the communications management unit to send a downlink request for updated aerodynamic and propulsion performance data in response to a determination in step (d) that the magnitude of the deviation exceeds the specified threshold without pilot intervention, and wherein the communication management unit is configured to send a downlink request for updated aerodynamic and propulsion performance data in response to receipt of an instruction to send a downlink request from the computer system.

19. The system as recited in claim 18, further comprising a control display unit that communicates with the computer system, wherein:

the communication management unit is further configured to receive an uplink message comprising updated aerodynamic and propulsion performance data;

the computer system is further configured to populate a current performance table with the updated aerodynamic and propulsion performance data to construct an updated performance table, calculate a second predicted value of a trip parameter using at least some of the updated aerodynamic and propulsion performance data, and instruct the control display unit to display the second predicted value; and the control display unit is configured to display alphanumeric symbology representing the second predicted value in response to receipt of an instruction to display the second predicted value from the computer system.

20. The system as recited in claim 19, wherein the control display unit is further configured to communicate start and end waypoints input by a pilot to the computer system, and the computer system is further configured to calculate the second predicted value of the trip parameter for a flight segment that starts at the start waypoint and ends at the end waypoint.

* * * * *